(12) United States Patent
Hartrampf et al.

(10) Patent No.: US 7,729,796 B2
(45) Date of Patent: Jun. 1, 2010

(54) ROBOT HAND AND METHOD FOR AUTOMATICALLY PLACING AN ELEMENT

(75) Inventors: Gerd Hartrampf, Abenberg (DE); Christian Böhner, Burghaslach (DE); Klaus Dehlke, Windsbach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 421 days.

(21) Appl. No.: 11/804,840

(22) Filed: May 21, 2007

(65) Prior Publication Data

US 2008/0247844 A1  Oct. 9, 2008

Related U.S. Application Data

(63) Continuation of application No. PCT/EP2005/010207, filed on Sep. 21, 2005.

(30) Foreign Application Priority Data

Nov. 19, 2004  (DE)  ........................ 10 2004 056 046
Dec. 16, 2004  (DE)  ........................ 10 2004 061 164
May 13, 2005  (DE)  ........................ 10 2005 023 099

(51) Int. Cl.
*B23P 21/00* (2006.01)
*B21J 15/02* (2006.01)
*G06F 19/00* (2006.01)

(52) U.S. Cl. ........................ 700/175; 700/160; 700/174; 700/180; 29/426.4; 29/524.1; 29/716; 29/771; 29/243.53; 29/243.54; 72/391.6; 72/453.16

(58) Field of Classification Search ............ 29/243.524, 29/243.525, 243.53, 243.54, 426.4, 524.1, 29/716, 771; 227/27, 51, 58, 69, 152; 700/160, 700/173–175, 177, 180, 181; 72/391.4, 391.6, 72/453.15, 453.16
See application file for complete search history.

(56) References Cited

U.S. PATENT DOCUMENTS

| | | | | |
|---|---|---|---|---|
| 4,590,578 A | * | 5/1986 | Barto et al. | 700/254 |
| 4,894,901 A | * | 1/1990 | Soderberg | 29/428 |
| 5,104,024 A | * | 4/1992 | Brewer et al. | 227/55 |
| 5,271,686 A | * | 12/1993 | Herring et al. | 403/229 |
| 5,625,940 A | * | 5/1997 | Butt et al. | 29/709 |
| 6,014,802 A | * | 1/2000 | Guerin | 29/714 |
| 6,108,896 A | * | 8/2000 | Gignac et al. | 29/524.1 |

(Continued)

FOREIGN PATENT DOCUMENTS

JP  8-323680  12/1996

*Primary Examiner*—David B Jones
(74) *Attorney, Agent, or Firm*—Laurence A. Greenberg; Werner H. Stemer; Ralph E. Locher

(57) ABSTRACT

The invention concerns an industrial robot (4) comprising a machining tool (2) attached to one hand (3) of the robot, designed to perform a hydraulic-driven movement relative to the hand (3) and connected therefor to a hydraulic unit (10). The hydraulic unit (10) is placed directly on a mobile part of the robot, in particular directly on the robot hand (3). Therefore there is no more need for hydraulic supply lines along the arm of the robot. Further, when the robot hand (3) changes tool, no separation of hydraulic lines is required. The machining tool (2) is in particular a device for placing blind rivets, thereby enabling an entirely automated process for placing blind rivets.

29 Claims, 8 Drawing Sheets

U.S. PATENT DOCUMENTS

| | | | |
|---|---|---|---|
| 6,112,390 A * | 9/2000 | Takeda et al. | 29/788 |
| 6,276,050 B1 * | 8/2001 | Mauer et al. | 29/716 |
| 6,427,336 B1 * | 8/2002 | Kojima et al. | 29/426.4 |
| 6,519,939 B1 | 2/2003 | Duff | |
| 7,076,864 B2 * | 7/2006 | Malaka | 29/798 |
| 7,123,982 B2 * | 10/2006 | Mauer et al. | 700/160 |
| 7,458,244 B2 * | 12/2008 | Dehlke et al. | 72/391.6 |

* cited by examiner

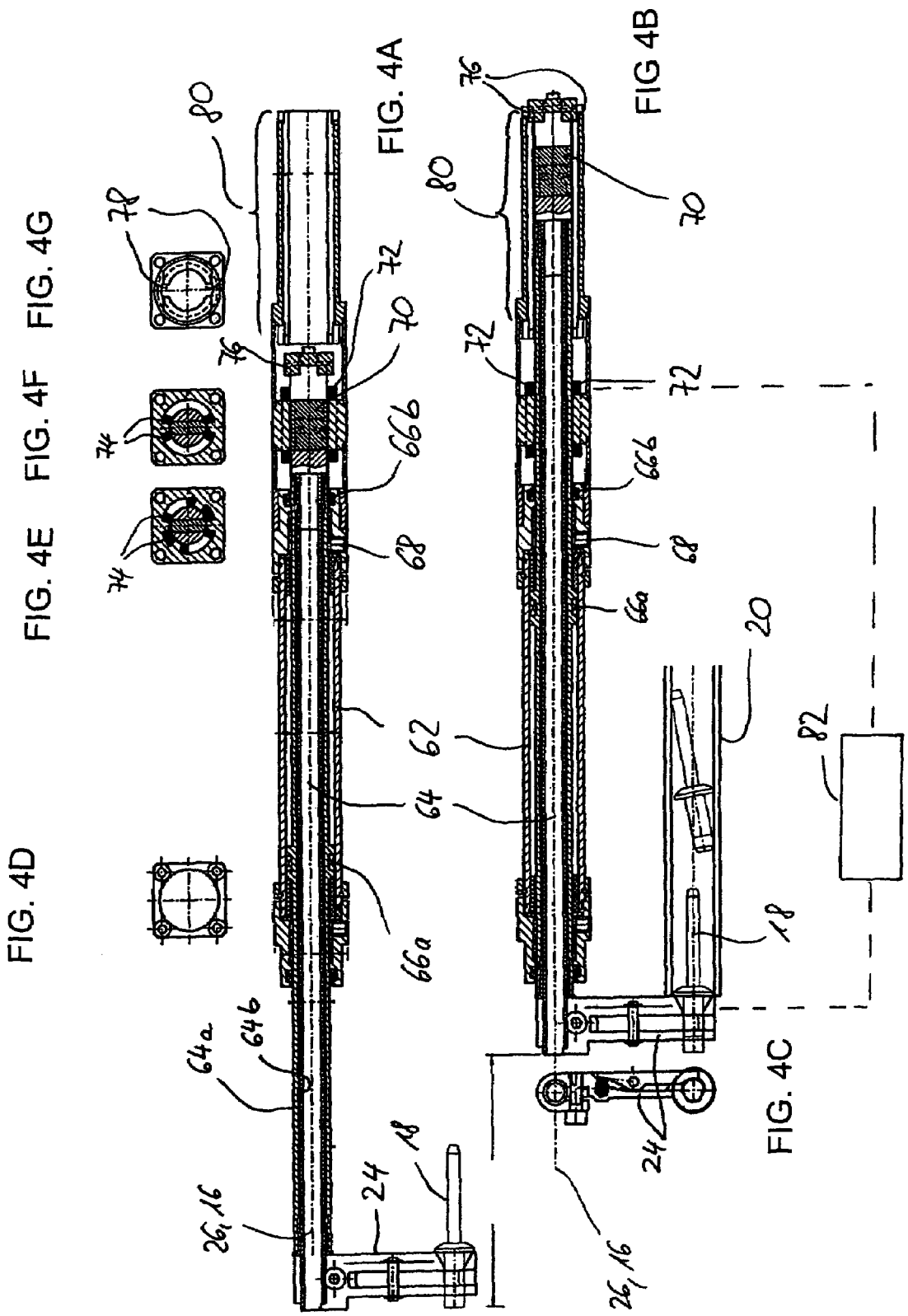

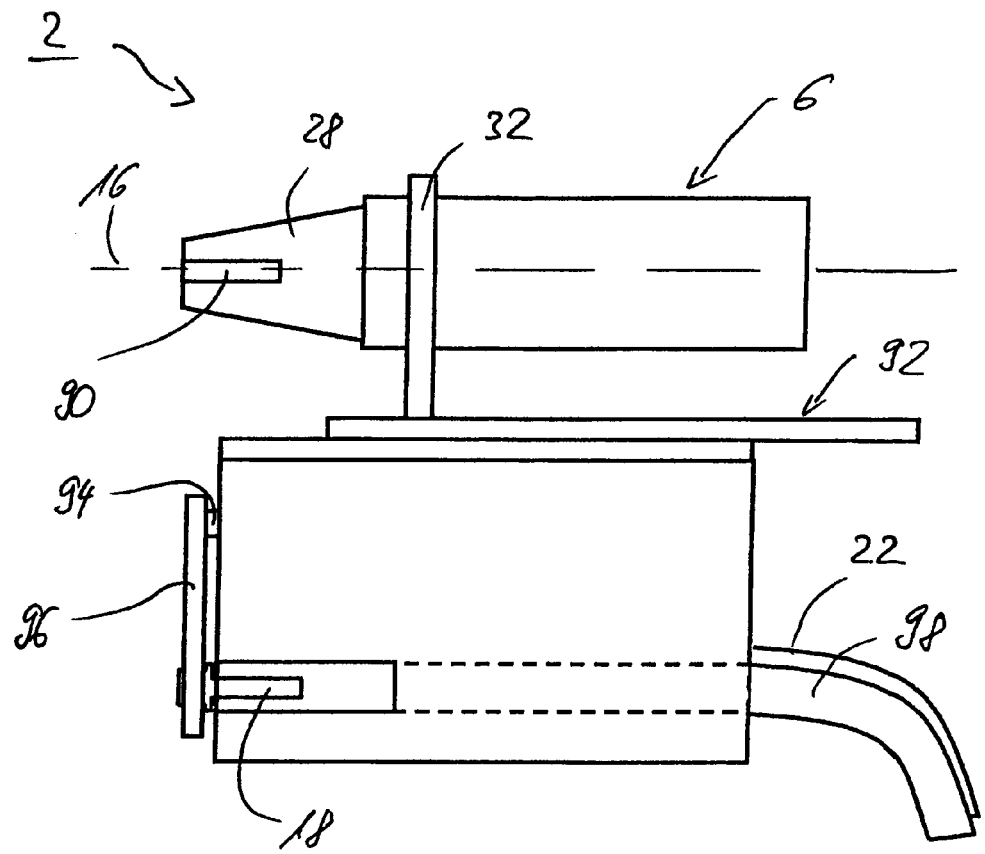
FIG. 6
FIG. 7
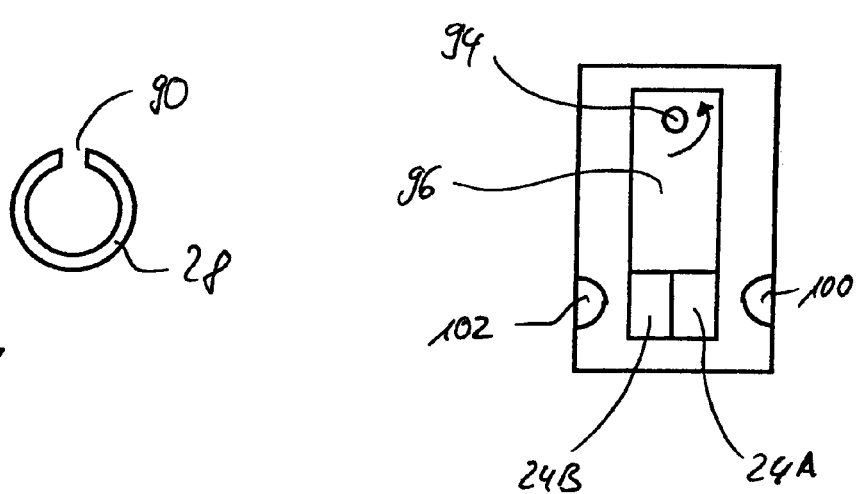
FIG. 8

ROBOT HAND AND METHOD FOR AUTOMATICALLY PLACING AN ELEMENT

BACKGROUND OF THE INVENTION

Field of the Invention

The invention relates to a robot hand of an industrial robot and to a method for the automatic placement of an element, for example a component or a joining element, using a robot hand of said type.

Industrial robots are used in many technical fields for the purpose of process automation. The robot has a plurality of robot arms which are moveable relative to one another and are in each case mounted so as to be moveable about a robot axis. Modern robots are designed as 6-armed robots with six axes of motion. The robot hand is conventionally arranged on the final robot arm by means of a flange, which robot hand carries a machining tool. A machining tool of said type is or comprises a tool unit, for example a welding tool, a gripper element or else a screw tool and a rivet placement unit.

A tool unit is to be understood within the present context in particular as a riveting unit for the placement of for example blind rivets, a screw unit for screwing in a screw element, or other pressing-in or joining-in units by means of which the elements can be inserted into receptacles/holes of the pre-holed workpiece.

When connecting two components by means of blind rivets, the blind rivet which is to be placed is conventionally firstly supplied manually to a mouth piece of the riveting unit from the front. The blind rivet is then inserted by means of the riveting unit into a through bore (rivet hole) of the components which are to be connected, and the blind rivet is placed. A residual blind rivet mandrel broken off during the placement process is conventionally caught in a catching container of the riveting unit which is arranged in the axial direction at the rear end of the rivet placement device.

Blind riveting technology is increasingly used in particular also in the motor vehicle field in order to connect components which have hitherto been connected to one another for example by means of welding. Motor vehicle production is automated to a high degree and the connection of the body components is for the most part carried out with the aid of welding robots which move automatically to the weld points and automatically weld the components to one another.

A hydraulic connection is often necessary for the machining process with the respective machining tool. In order to supply the pressurized hydraulic liquid, the machining tool is connected by means of hydraulic lines to a hydraulic power unit. It is necessary here for the hydraulic lines to be guided, for example by means of a robot hose pack, along the robot arms to the robot hand, and finally to the machining tool. On account of the intense loading as a result of the movement of the robot arms, said hydraulic lines are subject to a high degree of wear, and there is also the risk of damage, for example as a result of grinding against sharp corners.

The invention is based on the object of permitting reliable machining of a workpiece, in particular a body component, by means of a machining tool which is fastened to a robot hand and which performs a hydraulically generated additional movement to the movement of the robot hand.

The object is achieved according to the invention by means of a robot hand which carries a machining tool which is designed to perform a hydraulically-generated movement relative to the robot hand and which is for this purpose connected to a hydraulic unit which is arranged directly on the machining tool.

As a result of the arrangement of the hydraulic unit directly on the robot hand, no complex and long hydraulic supply lines are necessary and the risk of damage to the supply lines is low. The robot hand is conventionally arranged as an easily-exchangeable unit on the final robot arm via an adapter or a flange. The arrangement of the hydraulic unit directly on the robot hand achieves the significant advantage that, when exchanging the machining tool, for example with a robot welding hand, no separation of hydraulic lines is necessary at the separating point defined by the adapter. The hydraulic unit itself needs merely be connected to an electrical supply. It is therefore not necessary for hydraulic lines to be guided along the individual robot arms to an external hydraulic supply. The hydraulic lines do not hinder the freedom of movement of the industrial robot. In the field of motor vehicles in particular, there are often restricted installation conditions which are such that the guidance of hydraulic lines can be undesirable and can also lead to an increased degree of wear of the hydraulic lines.

SUMMARY OF THE INVENTION

The machining tool serves in particular to fasten a component or an element to a workpiece, in particular into a pre-holed workpiece. The machining tool is preferably a rivet placement device which is designed for the automatic placement of a rivet, in particular a blind rivet. Alternatively, the machining tool is for example a screw tool in which—in the same way as with the rivet placement device—a fastening or connecting element is placed, that is to say screwed, for the connection of two workpieces. Finally, the machining tool can also be a punching unit, by means of which a hole is punched or a punching element is inserted. The machining tools have in common that they carry out, for the respective machining process, an axial movement and/or a rotational movement which partially requires a considerable force which is applied by means of the hydraulics.

On account of the direct arrangement of the hydraulic unit, which is also referred to in the following as a hydraulic power unit, on the robot hand, said hydraulic unit must satisfy certain requirements. Such requirements are in particular functionality even under extreme accelerations of up to a multiple of, for example 20 times, the acceleration due to gravity, the provision of a high pressure for example of up to 600 bar, and a small and compact design, in order that the robot hand can also be used in restricted working spaces.

A hydraulic power unit which satisfies said requirements is for example described in the PCT application, which was submitted at the same time, with the title "Hydraulic power unit and method for providing a pressurized hydraulic liquid", to the content of which reference is hereby made.

The hydraulic unit expediently comprises an electric motor and at least one pump, which is driven by means of the electric motor, for pressure generation, wherein an accumulator space (5) with a variable compensating volume is provided for the hydraulic liquid which is sucked up by the pump (16), in which accumulator space the hydraulic liquid is enclosed in a gas-free state, in particular under pressure.

As a result of the arrangement of the accumulator space with the variable compensating space in which the hydraulic liquid is arranged in a gas-free state, the infiltration of air into the hydraulic liquid and foaming of the latter are avoided. The change in a hydraulic volume of the machining tool which occurs during the working process of the machining tool leads to a change in the compensating volume of the accumulator space. In contrast to conventional hydraulic units, therefore, no air is used for the volume compensation in the compensating volume. In the hydraulic power unit proposed here, fast movements and in particular abrupt accelerations, for example directional changes, therefore do not lead to foaming of the hydraulic liquid.

Here, the hydraulic liquid in the accumulator space expediently has an overpressure over an ambient pressure. This reliably prevents foaming. Said overpressure is preferably in the range of a few $10^5$ Pa, in particular between 3 and $50 \times 10^5$ Pa.

In order to obtain as compact a design of the hydraulic power unit as possible, the electric motor and the pump are arranged in a housing of the power unit, and the interior space which is surrounded by the housing forms the accumulator space, and is therefore filled with hydraulic liquid. The electric motor and the pump are therefore arranged in the hydraulic liquid, in particular hydraulic oil. The housing is hermetically sealed to the outside overall. As a result of this design, a separate compensating tank is not necessary. In addition, no supply lines are necessary from the compensating tank to a suction side of the pump.

In order to form the variable compensating volume, according to an expedient refinement of the invention, a compensating wall of the accumulator space is arranged in the manner of a piston so as to be moveable and sealed off with respect to a stationary housing wall of the accumulator space. As a result of this design with the mechanically in particular rigid compensating wall, a very robust design is obtained. The preferred embodiment as a piston has the additional advantage of a simple design. The pressure generating device is therefore designed in the manner of a piston accumulator space. As an alternative to the mechanically rigid design, the compensating wall is designed for example as an elastic diaphragm.

According to a particularly preferred design, at least two pumps on the one hand for providing a low-pressure partial flow and on the other hand a high-pressure partial flow are provided. A two-stage hydraulic power unit is therefore provided. This has the advantage that different pressure stages can be provided as a function of the respective application with little energy expenditure. Different pressure requirements are therefore catered for in a simple, energy-saving manner. In the case in particular of a blind rivet placement process, it is not necessary for a high pressure to be provided at the start of the placement process.

The at least two different pumps are expediently actuated together by the electric motor. A plurality of different hydraulic partial flows of different pressures and/or of different delivery quantities are therefore generated by means of one and the same electric motor, such that a very wide variety of pressure requirements can be met using only one electric motor and therefore in a very space-saving manner. Said design is particularly advantageous in the case in particular of two-stage or multi-stage machining processes in which a wide variety of pressure requirements may be made during one working process. For example, long axial strokes must be performed at only low pressure, and short axial strokes must be performed at high pressure, such as for example in a blind rivet placement process.

The pumps are preferably actuated together by means of an eccentric shaft of the electric motor and are therefore arranged approximately annularly around the eccentric shaft. The pumps are therefore actuated by the electric motor directly without the interposition of a gearing. Here, when providing two hydraulic partial flows, a plurality of pumps are expediently used for the generation of the low-pressure partial flow and a plurality of pumps are expediently provided for the generation of the high-pressure partial flow, with a pump for the high-pressure partial flow and a pump for the low-pressure partial flow preferably being arranged alternately adjacent to one another.

A valve arrangement is also preferably provided for controlling the at least two partial flows, which valve arrangement is designed such that in each case only one partial flow is provided at the outlet of the hydraulic power unit. In this way, no external control valves are required outside the power unit for switching from the one partial flow to the other partial flow, such that a more compact design is obtained overall. Here, the valve arrangement is in particular designed such that an automatic switch between the partial flows is made as a function of the present pressure requirement.

In order to keep the energy required for generating the pressure as low as possible, the valve arrangement is also preferably designed such that in each case one of the partial flows can be placed in a pressureless state. It is therefore provided in particular that in each case one of the partial flows is pressureless during operation. The electric motor needs therefore build up pressure in only one partial flow, and can therefore be of lower-power and compact design.

A hydraulic unit of said type is designed in particular to generate high pressure of up to 600 bar. As a result of the specific design, it is extremely compact. In addition, its functionality is ensured even at extreme accelerations for example up to 20 times the acceleration due to gravity.

With regard to the design of the machining tool for the placement of a fastening element, in one expedient refinement, a placement unit for the placement of the fastening element and a supply device for the automatic supply of the fastening element to the placement unit is provided. Here, the supply unit comprises a gripper unit for automatically receiving the fastening element from a provision unit and for supplying it to the placement unit. Here, the gripper element is moveable in the axial direction and/or rotatable about the axial direction.

This design permits a fully automatic placement process for fastening the fastening element. In the case in particular of the design as a rivet placement tool for the placement of a blind rivet, the hitherto manual loading of a mouth piece of the placement unit, which is designed as a riveting unit, is automated by means of the supply unit. The automated placement process permits in particular also improved process monitoring, since the working processes of the industrial robot are preferably monitored automatically. There is no risk of deliberate or inadvertent maloperation by the operating personnel during the placement process.

According to one expedient refinement, the gripper element is arranged on a rotary element which is rotatable about the axial direction, with at least one electromagnet being provided which is designed such that a torque which acts on the rotary element is generated by means of a magnetic force. A mechanical force transmission via a gearing or the like does not take place. This has the particular advantage that the rotational movement can take place on the one hand with very little wear and on the other hand very quickly in comparison to a mechanical transmission, so that it is possible to obtain lower clock rates. Here, the clock rate is to be understood to mean the timespan between two placement processes. A further particular advantage of the magnetic drive is that, in the event of an obstruction of the rotary element or of the gripper element by an obstacle, said rotary element and gripper simply come to a standstill. In contrast to a positive mechanical drive, there are therefore no mechanical forces generated here which could cause damage. Here, the rotary element is expediently designed in the form of a rod or an elongate element.

The rotary element is in particular a rotor of a drive which is designed in the form of an electric motor.

Here, the rotary element is preferably rotatable between at least two defined angular positions. The two angular positions correspond to the rotational position on the one hand for receiving the blind rivet from the supply unit which is designed as a rivet supply, and on the other hand for passing the blind rivet to the mouth piece. Here, the angular positions are defined by the arrangement of the magnetic poles. A pole reversal of the respective poles therefore leads to the rotary element rotating from the one angular position into the other angular position. No mechanical stops or stop elements are therefore required. Moreover, the magnetic drive is already designed such that the rotary element comes to rest in predefined angular positions.

A third defined angular position is preferably provided which corresponds to the rotary position for passing a residual mandrel from the placement unit. This design is based on the consideration of the residual mandrel also being received by the rivet supply unit and being passed over to a residual mandrel disposal unit, for example a collecting container.

To form the magnetic drive, the magnetic poles are arranged so as to be distributed about the periphery of the rotary element. Here, the poles of a permanent magnet are expediently arranged on the rotary element and the poles of an electromagnet, whose polarity can be easily reversed, are expediently arranged around the rotary element. Since the poles of the electromagnet are arranged statically, it is easily possible to ensure the power supply here.

In general, the use of permanent magnets has the particular advantage that, as a result of the magnetization of the rotary element, a permanent magnetic force acts on said rotary element even when the electromagnet is deactivated, which magnetic force holds the rotary element in a defined rotational position or into which defined rotational position the rotary element is automatically moved. This magnetic holding force which is generated in this way is preferably set such that, in all operating situations, the rotary element is held in a defined rotational position and therefore in a defined position solely by the magnetic force and without holding elements.

With regard to a compact design, the rotary element is preferably at the same time moveable in the axial direction. The rotary element is therefore capable of performing a superposed movement both in the axial and also in the rotational direction.

According to one expedient refinement, for this purpose, the rotary element is guided telescopically in a guide tube which is embodied in particular as a pneumatic cylinder. Here, the poles of the electromagnet are in particular arranged within the guide tube. This obtains a simple and compact design overall.

A pneumatic drive is preferably provided for the movement in the axial direction. Here, in particular corresponding pneumatic connections, valves and the like are provided on the guide tube. The rotary element which is mounted axially in the guide tube is expediently acted on directly with pressure. The rotary element is sealed off with respect to the guide tube within the latter in order to permit a pressure build-up.

In one preferred embodiment, the guide tube has an axial positive guide for the rotary element in a rear region, so that a rotational movement of said rotary element is prevented. During the axial displacement of the rotary element, the latter moves out of a retracted position into a forward rotary position in which the rotary movement then takes place. This design ensures that the rotary movement can take place only beyond a defined axial position and that for example the mouth piece of the riveting unit is not damaged as a result of a premature rotary movement. With regard to the shortest clock times as possible, the positive guide also makes it possible to activate the magnetic drive early when the rotary element is still situated in the retracted position. For the axial positive guidance, a tongue and groove guide is preferably formed between the rotary element and the guide sleeve.

A control unit is provided for activating the magnetic drive. Said control unit activates the magnetic drive in particular already when the rivet supply unit receives a blind rivet from the rivet supply. At this time, the rotary element is still in its retracted position, since in this position, the blind rivet is given from the rivet supply to the rivet supply unit.

During the loading of the mouth piece of the placement unit with the blind rivet, said blind rivet is conventionally inserted into the mouth piece with its residual mandrel forward in the axial direction. In the case of an automated supply and an automated placement process, it is necessary for this purpose for the placement unit, after the placement process is complete, to be moved sufficiently far back from the workpiece that the blind rivet can be automatically supplied to the mouth piece from the front by a supply device. The return movement and renewed feed movement therefore takes place over a comparatively long path and therefore takes considerable time.

In order to reduce the cycle time for the placement process in relation hereto, it is provided according to one preferred refinement that the placement unit, in particular the mouth piece, has a lateral slot, and that the blind rivet is supplied to the mouth piece laterally, that is to say perpendicular to the axial direction.

The supply unit preferably also has a lateral slot, so that the blind rivet can be guided out laterally from a holding position in which it is provided in the supply unit for being passed to the gripper element. In the simplest case, the supply from the holding position into the mouth piece expediently takes place by means of a simple rotational movement of the gripper tool about a rotational axis which is aligned parallel to the axial direction of the placement tool.

The fastening elements are conventionally supplied to the placement unit from a separating system via a supply hose. This generally takes place pneumatically by virtue of the individual fastening elements being fired in individually by the separating station. In the case of the placement unit being arranged on a robot hand, there is again the problem here of the supply lines, which hinder the movement of the robot hand, in particular in restricted working spaces. There is additionally the risk here of damage as a result of rubbing against sharp edges. In the case of long supply hoses, that is to say a great distance between the separating station and the placement unit, a high pneumatic pressure is additionally required and/or high air quantities are additionally required, which can exert a considerable load on the central pneumatic system of a production plant. According to one preferred refinement, it is therefore provided that the provision unit has a magazine for storing a plurality of fastening elements. The fastening elements are therefore stored directly on the robot. There is therefore no troublesome supply hose to a separating station provided.

With regard to as simple a design as possible, the magazine preferably comprises at least one magazine hose which is designed to hold a plurality of fastening elements in a row. Here, a magazine hose is to be understood to mean a tubular element or a bore in which the individual fastening elements can be arranged one behind the other in a row. Here, the inner diameter of the magazine hose is matched to the outer diameter of the fastening elements, that is to say the inner diameter is conventionally slightly larger than the outer diameter of the fastening elements in order to avoid the latter becoming jammed in the magazine hose. Here, the magazine hose is part of a conventional supply hose. When using blind rivets as fastening elements, these partially overlap: the forward-pointing partial region of the blind rivet, that is to say the rivet sleeve, is arranged adjacent to the rear partial region of the preceding blind rivet, that is to say the residual or tensile mandrel. By using a magazine hose which is designed in the manner of a supply hose, it is not necessary to make any provisions for the passing of the blind rivet to the gripper element. Moreover, it is possible for conventional gripper elements to be taken into consideration, as are also used in connection with the individual firing-in via a supply hose. For the controlled delivery into a forward provision position within the magazine hose, the latter is, according to one expedient design, acted on with compressed air during operation. Said compressed air is present here either permanently or only on demand.

In order to provide the greatest possible reserve of fastening elements, a plurality of magazine hoses are expediently held in a moveable hose holder. Here, the hose holder is held in particular rotatably or else so as to be longitudinally or transversely moveable in order to place in each case one of the magazine hoses into an extraction position in which the fastening elements are dispensed.

An automated introduction of the element, in particular joining element such as for example a blind rivet, into a pre-holed workpiece by means of a robot, is problematic. On account of position deviations of the tool unit on the robot or component tolerances of the workpieces, undesired deviations of the relative position between the respective element and the prepared hole can occur. In motor vehicle production, for example, a plurality of pre-holed sheet metal parts are joined one on top of the other so that the fastening holes of the sheet metal parts are aligned with one another. There is however the risk that the fastening holes are not aligned optimally with one another. The robot also has—even if only slight—an imprecision when approaching a learned nominal position.

Such undesired deviations therefore lead in particular to an offset of the longitudinal axis of the element relative to the central point of the pre-holed hole and/or to an angular deviation of the longitudinal axis of the element from that of the pre-holed hole. Such deviations can considerably adversely affect the connection quality between the element and the workpiece.

In order to automatically compensate such deviations during the joining process, according to a further aspect, a compensating unit is preferably provided which is designed such that the machining tool, in particular the placement unit or riveting unit, is mounted so as to be aligned in the axial direction in such a way as to permit, during the placement process, a compensating movement in an x-y plane which is aligned perpendicular to the axial direction. The riveting unit is therefore held in said plane in the manner of an elastic mounting which, on the one hand, permits a deflection from the precise axial alignment. On the other hand, said mounting ensures, in the manner of an elastic mounting, that the riveting unit is moved back into its precise axial alignment after the placement process.

The compensating unit permits assured and reliable automatic insertion of elements into pre-holed holes in workpieces. Automated, reliable and assured process monitoring is hereby permitted, and preferably also used, as a particular advantage. For this purpose, relevant data of each individual joining process is detected and evaluated by means of sensors. In the event of errors, an error signal is output. Defective connections for example on account of errors in the manual placement of a blind rivet are thereby prevented.

As a result of the compensating movement in a plane perpendicular to the axial direction, a self-alignment of the tool unit takes place automatically as soon as there is an undesired relative deviation between the element which is to be inserted and the bore or joining hole. Both for the case that the longitudinal axis of the element is offset relative to the hole center and also for the case that the longitudinal axis of the element is tilted relative to the hole axis, forces occur as the element is inserted into the hole, which forces place the element in the correct position. As a result of a compensating movement being permitted, said occurring forces are therefore utilized for automatic self-alignment.

A particular advantage of this self-alignment is that for example imprecision of the robot when approaching the actual hole position (offset of the longitudinal axis of the element relative to the hole center) is compensated only by said self-alignment. No complex re-adjustment of the robot, and in particular no complex hole detection, is therefore required. Both of these lengthen undesirably the clock time. The only prerequisite for said self-alignment is that the hole and/or the element has an insertion bevel or insertion chamfer and that the element is moved to the hole at least with such a degree of precision that insertion bevels of the element and of the hole at least partially overlap and that the at least one insertion bevel partially overlaps the hole edge or the edge of the element, so that in the event of an axial feed movement, a force is generated on the element with a radial force component. Said radial force component ensures finally the desired automatic movement of the tool unit in an X-Y plane perpendicular to the axial direction.

Here, a holding element is expediently provided which holds the riveting unit in a defined position within the plane so as to be aligned perpendicular to the axial direction and, only under the action of a predetermined force, releases the tool unit so as to permit the compensating movement. This design is based on the consideration that the riveting unit overall is comparatively heavy, so that holding the riveting unit in the axial alignment requires a high holding force. In addition, this design is based on the consideration that, during the placement process, a compensating movement should take place with as little force as possible, and thus that no return forces, which counteract the compensating movement, act on the blind rivet.

In order to permit the compensating movement, in one expedient refinement, a compensating element is provided which is connected to a holder. The compensating element is hereby arranged on the holder so as to be moveable in the plane perpendicular to the axial direction, and is in particular a sliding element, for example a sliding plate which can slide freely between two guides of the holder in particular within predefined limits.

The riveting unit is expediently connected to the compensating element by means of a bearing; the riveting unit itself is thus held on the compensating element by means of the bearing. Here, the bearing is designed so as to permit a tilting movement of the riveting unit relative to the axial direction. The compensating element itself does not perform any tilting movement for the compensating movement.

With regard to the locking in the axial direction, the holding element expediently engages into the compensating element, specifically in particular in the axial direction with a holding force which acts in the axial direction. Here, said holding force is expediently exerted by a spring element.

According to one preferred refinement, a return device is provided which, after a compensating movement is complete, brings the compensating element back into its rest position or initial position. Said return movement takes place here in particular automatically as soon as the placement process has ended and the force acting on the tool unit, which force caused the compensating movement, has fallen again.

Here, the return device expediently comprises the holding element. The latter therefore has a dual function, specifically on the one hand holding the compensating element in its initial position and on the other hand returning the compensating element into the initial position.

On account of the compensating element which is moveable in the x-y plane and the holding element which is aligned in the axial direction, a radial force is exerted on said holding element by means of the compensating element if a compensating movement is necessary. Here, in order to permit an automatic release and also return of the compensating element, the holding element is expediently formed with a spherical or conical tip. The latter preferably engages into a complementarily conical receptacle in the compensating element. On account of said conical or inclined design, when a radial force is exerted on the holding element, a force component acting in the axial direction is generated, which force component automatically presses the holding element back counter to the elastic return force exerted by means of the spring element, so that the locking is released. Inversely, by means of said design, an automatic return is obtained if the holding element is pressed back into the receptacle by means of an external force.

For the return after the placement process, the riveting unit must be placed back into the precise axial alignment in order to have a defined initial position for the next placement process. On account of the relatively high weight of the riveting unit, a comparatively high return force is required for this purpose. According to one expedient refinement, it is provided that the holding element is connected to a pressure unit, by means of which a pressure force which acts in the direction of the compensating element can be exerted on the holding element. The holding element is thus moved toward the compensating element by means of the pressure force. On account of the conical design, an automatic return of the compensating element into the initial position takes place. The riveting unit is thereby returned in the axial direction. Here, in order to permit said automatic return, the sliding movement of the compensating element is expediently limited in such a way that the conical faces, which correspond to one another, of the compensating plate and of the holding element overlap in the radial direction in order to be able to exert the return force.

With regard to as compact a design as possible, the holder is at the same time designed as a feed unit which permits a feed movement of the riveting unit in the axial direction. The holder therefore moves in the axial direction, and thereby at the same time moves the compensating plate, and with the latter the riveting unit, in the axial direction.

According to a further aspect of the fully-automated blind rivet placement process, a hole detection unit is preferably provided which is designed to detect the position of a rivet hole. This design is based on the consideration that, although the industrial robot is taught a nominal position of the rivet hole, certain tolerances of a few millimeters do however occur, so that the riveting unit is not positioned precisely over the rivet hole. The precise position of the rivet hole is therefore detected by means of the hole detection unit, and the blind riveting unit is correspondingly adjusted.

In order to permit precise hole detection, the hole detection unit comprises a light source and an optical camera and an evaluation unit for evaluating the images recorded by the camera. The hole detection is carried out optically in this preferred design. For assured position detection, the position of the hole is determined here by detecting the corner of the hole edge. The hole edge offers a simple to detect and clearly distinguishable structure and is therefore particularly suitable for detecting the position of the rivet hole.

Here, the light source is expediently a linear laser which generates at least three laser beams which are arranged so as to be offset relative to one another at a predetermined rotational angle. By using a linear laser, on the one hand, the component is illuminated with high-intensity light, so that suitable and defined conditions for the camera are present. In comparison to large-area illumination, the illumination merely with lines also has the advantage of generating less disturbing reflections. It is possible then to calculate the position of the rivet hole by means of the rotationally offset arrangement of the lines and from the determined points of the hole edge.

A further particular advantage of the use of linear illumination is to be considered that of movement being possible within the region covered by the lines, and therefore that of the rivet hole being detected earlier. The determination of the position of the rivet hole is expediently carried out continuously during the process of the blind riveting unit. This permits particularly fast movement to the precise rivet hole position.

In order to permit fast and in particular flexible movement to the actual rivet hole position with the blind riveting unit, according to a further aspect, the riveting unit is preferably connected to a re-positioning unit for precise positioning, which re-positioning unit permits a movement of the riveting unit within the plane perpendicular to the axial direction. The individual robot arms are therefore not re-adjusted for the fine-adjustment. On account of the relatively high masses of the robot arms, this is associated with comparatively high expenditure. In addition, in unfavorable positions, the problem can occur that, for a relatively slight change in position, a plurality of axes of the generally 6-axis industrial robot must be varied. By means of the separate precision drive, a very fast movement to the actual hole position is made possible. The industrial robot itself requires only to move to its learned nominal position. Short clock times overall can be obtained in this way.

The object is also achieved according to the invention by means of a method for the automatic placement of a fastening element, in particular a blind rivet, as per claim 29. The listed advantages and preferred designs with regard to the industrial robot are also to be correspondingly transferred to the method.

The fully-automated placement process is obtained in particular by means of the advantageous interaction of the following components which in each case individually form separate and inventive partial aspects independently of the other aspects:

the design of the hydraulic unit,
the design of the supply unit, in particular with the magnetic drive,
the design of the compensating unit,
the design with the lateral supply slot from the placement unit and/or with the lateral extraction slot on the provision unit for the lateral supply of the fastening element,
the design of the magazine,
the arrangement and design of the hole detection unit, and
the arrangement of a separate re-positioning unit for precise positioning.

Exemplary embodiments of the invention are explained in more detail in the following on the basis of the figures. Here, the individual components are described in connection with a blind rivet placement device. The use of the individual components is however not restricted to a blind rivet placement device. In the figures, in partially schematic and simplified illustrations in each case:

BRIEF DESCRIPTION OF THE SEVERAL VIEWS OF THE DRAWING

FIG. 4*a* shows a rivet supply unit with the gripper element extended, FIG. 4*b* shows a rivet supply device with the gripper element retracted, FIG. 4*c* shows a front view of the gripper element, FIGS. 4*d*-4*g* are sectioned illustrations through the rivet supply unit at different longitudinal positions, FIG. 6 is a highly schematized illustration of a blind rivet placement device, FIG. 7 shows a front view of the slotted design of a mouth piece of the placement unit, FIG. 8 shows a front view of a blind rivet handling device, by means of which the blind rivet supply and also the residual mandrel disposal take place.

DESCRIPTION OF THE INVENTION

Figure 1:
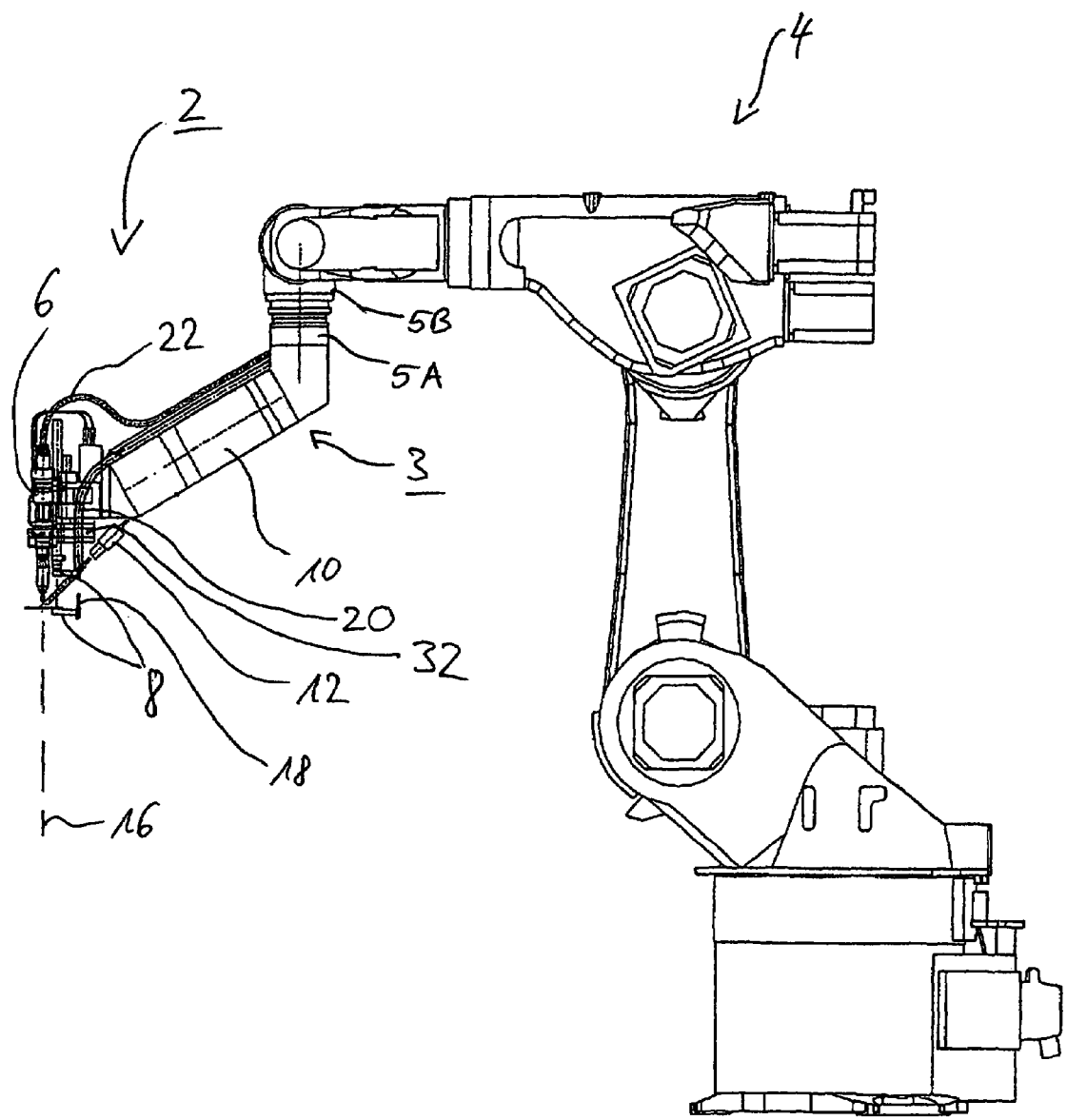
FIG. 1 shows a side view of an industrial robot whose robot hand is formed by a blind rivet placement device.

In the figures, identically-acting parts are provided with the same reference symbols. In FIG. 1, a blind rivet placement device 2 as an angled robot hand 3 is arranged as a machining tool on a multi-axis industrial robot 4. Here, the placement device 2 is fastened in an exchangeable manner to the so-called sixth axis of the six-axis industrial robot 4 by means of flanges 5A, B. The placement device 2 comprises a placement or riveting unit 6, a rivet supply unit 8, a hydraulic unit 10 and a hole detection unit 12. In the embodiment variant as per FIG. 2, a re-positioning unit 14 for the precise positioning of the riveting unit 6 within an X-Y plane, which is clamped perpendicularly to an axial direction 16, is also provided. Overall, the placement device 2 is a mechanically rigid structure. Only the riveting unit 6 is arranged so as to be moveable within certain limits. The industrial robot 4 with the placement device 2 is suitable for the fully-automatic placement of a blind rivet 18. A hose, as a provision unit 20 for providing and supplying the rivets 18, is provided for supplying the blind rivet 18 to the rivet supply device 8 as per FIG. 1. Blind rivets 18 are for example individually fired in pneumatically from a separating station (not illustrated here) via the hose. In the exemplary embodiment, the riveting unit 6 is also connected at its rear side to a further hose which is part of a residual mandrel disposal unit 22 and via which a residual mandrel which is generated during the placement process is extracted by means of a vacuum.

For the automatic placement process, the blind rivet 18 is initially supplied via the provision unit 20 to a gripper element 24 of the rivet supply unit 8 and is received by the latter. The gripper element 24 is subsequently moved forward in the axial direction 16, and a rotational movement subsequently takes place about a rotational axis 26 which is aligned parallel to the axial direction 16, so that the blind rivet 18 is positioned in front of a mouth piece 28 of the riveting unit 6. The gripper element 24 is subsequently moved back in the axial direction 16 and the blind rivet 18 is inserted, with its rivet mandrel forward, into the mouth piece 28. The gripper element 24 then rotates away again, the riveting unit 26 is moved in the axial direction 16 to a workpiece 30 (illustrated here merely schematically as a line). Here, the blind rivet 18 is inserted with its shank forward into a rivet hole 29 (cf. FIG. 3) which is formed as a through bore through at least two workpieces 30 which are to be connected. The blind rivet 18 is inserted so far until it rests with its swage head on the workpiece surface. The rivet mandrel which is situated in the mouth piece 28 and is fixedly held by the riveting unit 6 is subsequently pulled backward by means of a hydraulic drive. For this purpose, the riveting unit 6 is connected by means of hydraulic lines (not illustrated here in any more detail) to the hydraulic unit 10.

Here, a closing head is formed on that side of the blind rivet 18 which faces away from the swage head, so that the two workpieces 30 are fixedly connected to one another. As soon as a predetermined tensile force is exceeded, the rivet mandrel breaks away and is extracted by means of a vacuum as a residual mandrel by means of the residual mandrel disposal unit 22. The riveting unit 6 subsequently moves back again and is moved by means of the industrial robot 4 to the next learned nominal position in order to carry out the next placement process.

Figure 2:
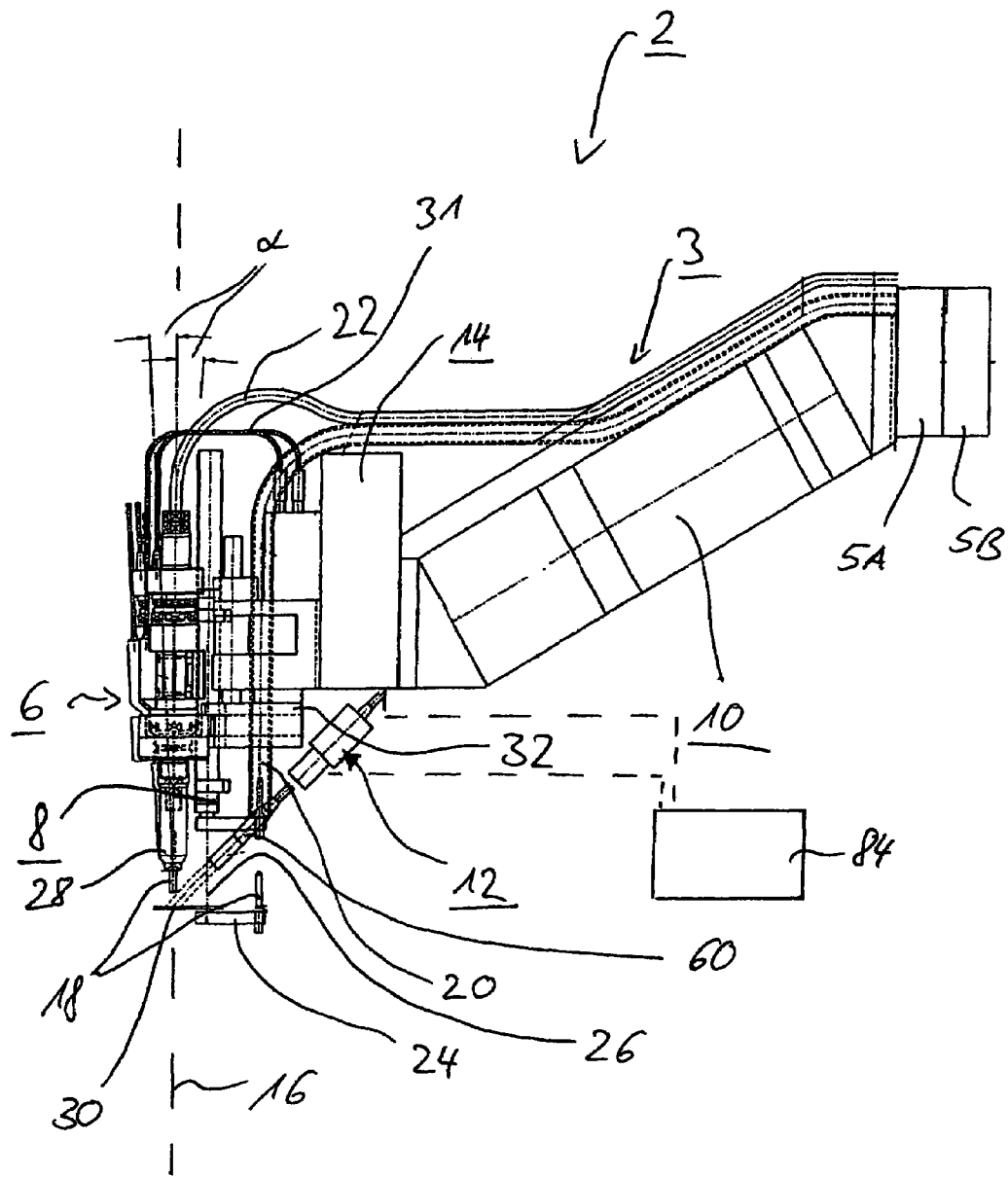
FIG. 2 is a side illustration of an alternative embodiment of a blind rivet placement device.

For a high-quality placement process, it is necessary for the blind rivet 18 to be aligned precisely relative to the hole 29, and for the swage head to rest flat against the workpiece surface. If the robot 4 does not move precisely to the hole 29, so that the blind rivet 18 is arranged eccentrically with respect to the hole 29, then the longitudinal axis of the blind rivet 18 must still be aligned centrally with respect to the hole, that is to say the blind rivet 18 must still be moved laterally. If the longitudinal axis of the blind rivet 18 is tilted, that is to say not aligned parallel to the hole axis, then the blind rivet 18 must be aligned axially parallel in order to ensure flat contact against the workpiece 30. In this case, it is therefore necessary for the riveting unit 6 overall to perform a tilting movement about the axial direction 16. This is illustrated in FIG. 2 in that the riveting unit 6 is illustrated once in the precise axial alignment and once offset by a tilting angle $\alpha$. The tilting angle $\alpha$ is for example 3°. The tilting movement is performed here only by the riveting unit 6. The remaining components of the placement unit 2 are arranged so as to be positionally fixed. Overall, therefore, the riveting unit 6 is mounted or held on a holder 32 in the manner of an elastic mounting.

Figure 3:
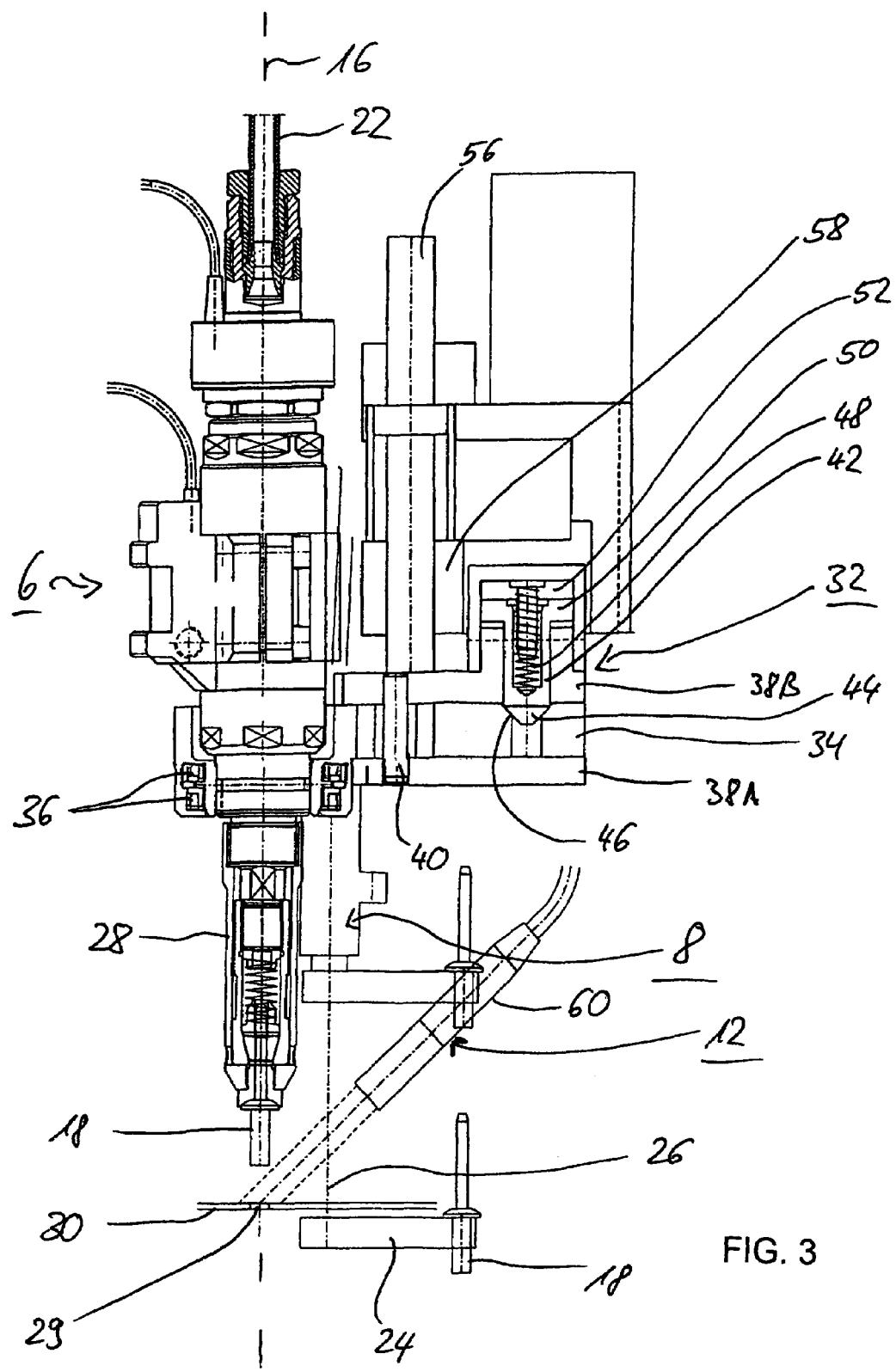
FIG. 3 is a partially sectioned side illustration of a riveting unit.

The construction and mode of operation of a compensating unit for permitting the compensating movement can be gathered from FIG. 3. The riveting unit 6 is fastened to a compensating element, which is designed as a sliding plate 34, by means of a bearing 36 which is designed as a self-aligning or pivoting bearing. The bearing 36 permits the tilting movement about the axial direction 16 and therefore also relative to the sliding plate 34. The sliding plate 34 itself is held so as to be moveable perpendicular to the axial direction 16 in the X-Y plane between two guide walls 38A, B of the holder 32. The sliding plate 34 can slide within predetermined limits between the two guide walls 38A, B in the plane perpendicular to the axial direction 16. The sliding plate 34 annularly encloses the riveting unit 6 in the bearing region. The two guide walls 38A, B are connected to one another so as to be fixedly spaced apart by means of a pin 40. The pin 40 is guided through the sliding plate 34 with a sufficiently large degree of play.

In the lower region, a holding element 42 is guided through the right-hand guide wall 38B, which holding element 42, with a frustoconical tip 44, engages into a conical receptacle 46 in the sliding plate 34. As an alternative to conical, a spherical design is provided. The holding element 42 is pressure into the receptacle 46 by means of a spring force. The holding element 42 therefore snaps in the manner of a latching element into the receptacle 46. For this purpose, a spring element 48 is provided which exerts a spring force on the holding element 42 in the axial direction 16. The preload of the spring element 48 is adjustable. On its rear side which faces away from the receptacle 46, the holding element 42 has a disk-shaped pressure plate 50. The holding element 42 is therefore designed overall in the manner of a pressure piston which has the tip 44 at its front side. The pressure plate 50 is mounted in a sliding fashion within a pressure unit 54 which is designed in the manner of a pressure cylinder and has a pressure space 52. The pressure space 52 is connected, in a way not illustrated in any more detail here, to a compressed air line, and can be acted on with compressed air on demand.

The compensating unit which permits the compensating movement is created by the interaction of the individual components, specifically the guide walls 38A, B, the sliding plate 34, the holding element 42, the bearing 36 and the pressure unit 54. Said compensating unit is designed as an integrated component and has a common housing for the individual components. The guide walls 38A, B are in particular housing walls.

If, during the placement process, the blind rivet 18 is not arranged axially parallel to the rivet hole, that is to say if the swage head does not lie flat on the surface of the workpiece 30, then as a result of the forces which occur during the placement, the blind rivet 18 will attempt to become aligned axially parallel to the rivet hole 29. A force is therefore exerted by means of the blind rivet 18 on the mouth piece 28 and therefore on the riveting unit 6. This force then leads to the riveting unit 6 exerting a force on the sliding plate 34 in the direction perpendicular to the axial direction 16. This force which is aligned radially with respect to the axial direction 16 is transmitted to the holding element 42. As a result of the conical design of the receptacle 46 and of the tip 44, there is a resulting force in the axial direction 16 which presses the holding element 42 rearward counter to the spring force of the spring element 48, so that the sliding plate 34 is moveable in the X-Y plane. The spring force and the cone angle are selected here in particular such that the sliding plate 34 is released for example at a torque above 10 Nm.

After the placement process, the riveting unit 6 must be moved back into the alignment in the axial direction 16. In order to reliably ensure said return, the pressure plate 50 is acted on with pressure so that the tip 44 is pressed into the receptacle 46 again. In this way, the sliding plate 34 is pulled back into its original position.

As can also be gathered from FIG. 3, the holder 32 serves at the same time as a feed unit for the feed of the riveting device 6 in the axial direction 16. For this purpose, the holder 32 comprises a guide rod 56 which is held in a slotted guide 58 and is moveable hydraulically in the axial direction 16. Here, the guide rod 56 is mechanically fixedly connected to the right-hand guide wall 38B and acts thereon. Also connected to the right-hand guide wall 38B is the housing of the pressure unit 54 which is thus moved with the guide wall 38B. The unit—composed of the two guide walls 38A, B, the sliding plate 34 and the pressure unit 54—is thus moved in the axial direction 16 by means of the guide rod 56.

FIG. 3 also illustrates a combined laser-camera unit 60 which is fastened, in a way not illustrated in any more detail here, to the placement unit 2 so as to be aligned obliquely with respect to the axial direction 16. The unit 60 has a laser as a light source and an optical camera which is not illustrated in detail here. The hole detection unit 12 is expedient in particular in connection with the arrangement of the re-positioning unit 14. A particular advantage of the compensating unit described here is to be considered that of it being possible for the re-positioning and hole finding to be dispensed with. Said two components are therefore preferably not provided when the compensating unit is provided.

Also illustrated in FIG. 3 is the gripper element 24 in the retracted position and in the forward extended position. From the forward extended position which is also referred to as the rotational position, the blind rivet 18 is placed in front of the mouth piece 28 by means of a rotational movement about the rotational axis 26.

The design of the rivet supply unit 8 and its function are explained in more detail below on the basis of FIGS. 4a-4h. As can be seen from FIGS. 4a and 4b, the rivet supply unit 8 comprises an outer guide tube 62 which is designed as a pneumatic cylinder and in which a hollow piston rod 64, which is designed as a rotary element, is held and guided so as to be moveable telescopically in the axial direction 16. The hollow piston rod 64 is designed as a double tube with an outer tube 64a and an inner tube 64b. The gripper element 24 is arranged at the front end of the inner tube 64b. The hollow piston rod 64 is sealed off with respect to the guide tube 62 by means of a front piston seal 66a, which is designed as a piston ring, and a rear sliding seal 66b. Provided in the space between said two seals 66a, 66b in the region of the rear seal 66b is a pneumatic drive for moving the hollow piston rod 64 within the guide tube 62 in the axial direction. For this purpose, a connection 68 is provided, by means of which a pneumatic line can be connected.

In order to impart the rotational movement, a magnetic drive is provided. In order to form said magnetic drive, a permanent magnet 70 is arranged at the rear end of the inner tube 64b. A plurality of magnet coils 72 are positionally fixedly held on the guide tube 62 so as to be suitably arranged encircling the inner tube 64b, such that a plurality of electromagnetic poles 74 are formed about the periphery of the inner tube 64b, the polarity of which electromagnetic poles 74 can be reversed on demand (in this regard, cf. in particular FIGS. 4e, 4f and 4h). The inner tube 64b can therefore be considered to be a rotor of an electric motor.

In the double-tube design of the hollow piston rod as described here, the rotational movement is advantageously decoupled from the axial movement. It is alternatively possible in principle for the hollow piston rod to also be designed as a simple tube or simple shaft.

Figure 4H:
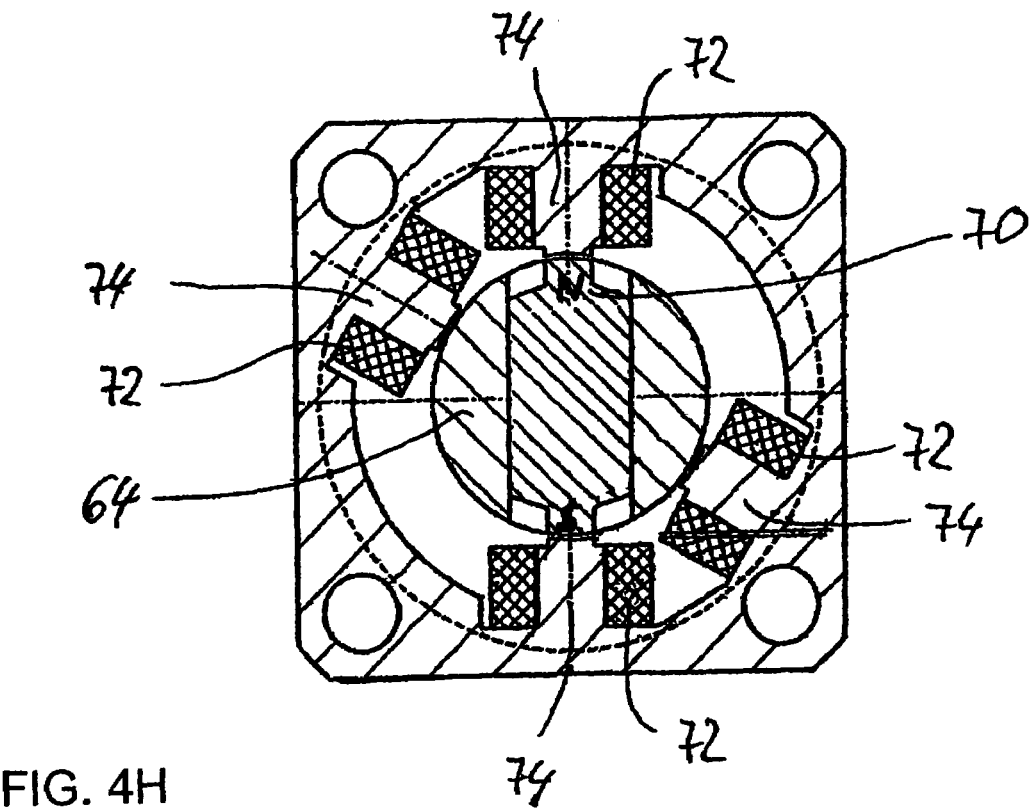
FIG. 4*h* is an enlarged sectioned illustration through the rivet supply unit in the region of an electromagnet.

In the design variant illustrated in FIG. 4h, a total of four electromagnetic poles 74 are provided, with in each case two poles 74 being arranged so as to be situated opposite one another, offset by 180°. This arrangement of the poles 74 which are arranged offset to one another defines fixed angular positions. By means of suitable actuation of the magnet coils 72, it is therefore possible to place the inner tube 64b into fixedly defined angular positions. The inner tube 64b and therefore the gripper element 24 are therefore placed into the in each case desired, fixedly defined rotational position either for the blind rivet 18 being passed from the rivet supply 20 or for the passing of the blind rivet 18 into the mouth piece 28.

As can be seen from FIG. 4h, the permanent magnet 70 is joined into a slot of the hollow piston rod 64 and therefore extends through the latter. In the region of its poles, the permanent magnet has in each case one lug or one projection. Corresponding to this, the core of the electromagnet 74 is also provided with a corresponding projection. By means of this design, only a very small gap is obtained in this region, so that the magnetic flux is as far as possible not interrupted. In addition, as a result of the constriction in this region, there is a high magnetic flux density, so that a high mechanical holding force in the defined angular position is obtained. This holding force is sufficiently large as a result of the magnetization even only by means of the permanent magnets 70, so that the inner tube 64b is held in the defined angular position even without the electromagnet. If another angular position is to be assumed, then a "pole reversal" is brought about by means of the activation of the electromagnet by means of an oppositely aligned magnetic flux, and the inner tube 64b rotates into the new nominal position.

The cross-sectional illustration in FIG. 4e illustrates an alternative design variant with a total of three pairs of poles 74, thereby defining three discrete angular positions. The third angular position here defines an angular position in which the residual mandrel is passed at a defined point to the residual mandrel disposal unit 22. In the exemplary embodiments in FIGS. 1 and 2, this is not required, since the residual mandrel disposal takes place rearward by means of a residual mandrel vacuum extraction.

At the rear end of the hollow piston rod 64, in the exemplary embodiment illustrated, two guide webs 76 which are rotationally offset with respect to one another are provided, which guide webs 76 are mechanically fixedly connected to the inner tube 64b. For this purpose, a corresponding element is fastened to the rear side of the hollow piston rod 64. Corresponding to this, the guide tube 62 is provided with guide grooves 78 which are of complementary design hereto (cf. FIG. 4g). Said guide grooves 78 are formed in a rear region 80. The guide grooves 78 serve to axially guide tube 62 in a defined angular position, and therefore prevent a rotary movement of the inner tube 64b. In principle, a single guide web 76 is also sufficient. In an alternative which is not illustrated here, at least one further guide web for guidance in a further defined angular position, and a further guide groove corresponding to this, is provided.

For controlling the movement profile of the rivet supply unit 8, a control unit 82 is provided which is illustrated only schematically in FIG. 4c. Said control unit 82 is connected to a sensor (not illustrated in any more detail here) which detects whether a blind rivet 18 has already been fired in when the gripper element 24 is in the receiving position. Furthermore, the control unit is connected to a magnet coil 72 in order to actuate the latter. The pneumatic feed of the shaft 64 is also controlled by means of the control unit 82.

Once it has been detected that a blind rivet 18 is situated in the receiving position, the magnet coils 72 are correspondingly poled in order to move the hollow piston rod 64 from the lower angular position into the upper angular position. Since, however, in the retracted position in which the blind rivet 18 is received, the permanent magnet 70 is situated in the rear region 80, no rotation takes place yet. At the same time, the magnetic drive is activated so that the shaft 64 moves forward in the axial direction 16. Once the permanent magnet 70 reaches the region in which the magnet coils 72 are arranged, the magnetically controlled rotational movement takes place to a defined rotational position in which the blind rivet 18 is situated in front of the mouth piece 28 of the placement unit 6. Since the magnet coils 72 are fixed in terms of position, the rotational movement always takes place only in the extended position at the predetermined rotational position. In the next step, the blind rivet 18 is inserted with its mandrel into the mouth piece 28 by being moved backward axially. Here, the hollow piston rod 64 is guided in a defined manner in the axial direction 16, by means of further guide webs which are not illustrated here, into a second angular position.

Figure 5:
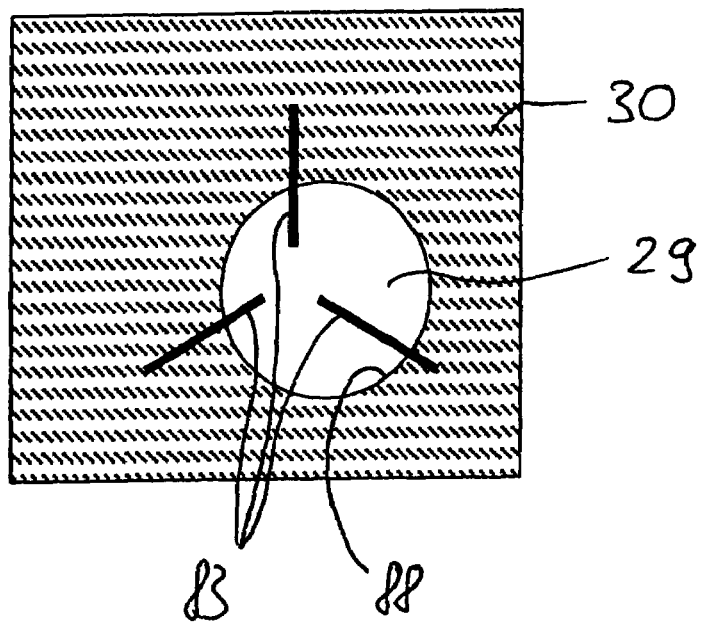
FIG. 5 shows a schematic plan view of a rivet hole for explaining the hole detection system.

With reference again to FIG. 2, the rivet hole detection system and its interaction with the re-positioning unit 14 for precise position of the riveting unit 6 is described below. For the automatic placement process, the industrial robot 4 initially moves into a learned nominal position. Since, on account of tolerance effects, the learned nominal position conventionally does not correspond precisely to the actual position, that is to say since the riveting unit 6 is conventionally not aligned precisely over the rivet hole 29, precise positioning of the rivet unit 6 is required. For this purpose, the hole detection unit 12 is provided. By means of the combined laser-camera unit 60, a region around the nominal position is illuminated by three laser beams 83 which are arranged so as to be rotationally offset relative to one another (in this regard, cf. also FIG. 5). By means of the camera which is integrated into the laser-camera unit 60, images are constantly recorded and evaluated by means of an evaluating unit 84. In order to evaluate and determine the position of the rivet hole 29, corner detection of the hole edge 88 is carried out. Once the position of the rivet hole 29 is detected, the evaluating unit 84 compares this with the present actual position of the riveting unit 6. If a deviation is present, then a corresponding control impulse is transmitted to the re-positioning unit 14, and the riveting unit 6 is re-positioned into the required actual position. In the case of said precise positioning, the hole position is expediently continuously detected and monitored in order to be able to influence the precise positioning, on demand, in the manner of closed-loop control.

The re-positioning unit 14 is designed here in particular as a linear drive with two degrees of freedom in the X and Y planes. Said re-positioning unit 14 is provided alternatively or in addition to the mounting, described with regard to FIG. 3, which permits the compensating movement.

In the case of the placement device 2 as per FIG. 6, the mouth piece 28 which is formed from one piece has a lateral supply slot 90 which extends along the axial direction 16 of the riveting unit 6. The slotted design of the mouth piece 28 can again be clearly seen from the schematic illustration as per FIG. 3.

The riveting unit 6 is fastened by means of the holder 32 to a linear unit 92 and by means of the latter to the provision unit 20. The linear unit 30 permits a feed movement of the riveting unit 6 in the axial direction 16 independently of a movement of the provision unit 20. The latter can in turn be moved in the X-Y plane by means of the re-positioning unit 14 (not illustrated in any more detail here).

The riveting unit 6 is elastically held in the holder 32 so as to permit tilting or compensating movements. The holder here has in particular the design as described with regard to FIG. 2.

The provision unit 20 has a rotary arm 96 which is arranged so as to be rotatable through 360° about a rotational axis 94 and which, in the exemplary embodiment has two gripper elements 24A, 24B (in this regard, cf. also FIG. 8).

The provision unit 20 is supplied at the rear side with a supply hose 98 and a residual mandrel hose as a residual mandrel disposal unit 22. By means of the supply hose 98, in each case one blind rivet 18, with its blind rivet sleeve forward, is fired into and held in a holding position, as illustrated in FIG. 6. Here, the blind rivet 40 is received by a receiving device which is integrated into the rotary arm 96. In the exemplary embodiment, the receiving device is integrated into the gripper element 24B, or the gripper element 24B is the receiving device. The gripper element 24B therefore grips the blind rivet 18 on its blind rivet sleeve. In the holding position of the blind rivet 18, the blind rivet mandrel remains in the provision unit 20. The latter has, in the region of the holding position, a first extraction slot 100, out of which the blind rivet 18 can be guided laterally solely as a result of a rotational movement of the rotary arm 96. Opposite the first extraction slot 100, a further slot 102 is provided, by means of which the provision unit 20 is supplied again with a residual mandrel by means of the gripper element 24A after the blind rivet 18 has been placed.

For supplying the blind rivet 18 into the mouth piece 28, the blind rivet 18 is initially fired into the holding position and therefore into the gripper element 24B and is gripped by the latter. A rotational movement of the rotary arm 96 about the rotational axis 94 then takes place, so that the blind rivet 18 is guided laterally out of the extraction slot 100, and the rotary arm 96 is rotated upward in the direction of the mouth piece 28. If a previous placement operation has taken place, a residual mandrel for disposal is situated in the mouth piece 28. This is, by means of an internal mechanism, which is not illustrated here in any more detail, of the riveting unit 6, in particular a spring mechanism, pushed forward after the actual placement process in the axial direction 16 so as to project as far as possible out of the mouth piece 16. Said residual mandrel is gripped by the gripper element 24A. The riveting device 6 then moves back so far in the axial direction 16 that the gripped residual mandrel can be conveyed further in front of the mouth piece 28 by means of a continued rotation. Here, only a small return movement of the riveting unit 6 is necessary.

The riveting unit 6 can then already move forward again, and the blind rivet 18 which is held by the gripper element 24B is, by means of a further rotational movement of the rotary arm 96, supplied laterally through the supply slot 90 to the mouth piece 28, without a continued movement of the riveting unit 6 in the axial direction 16 having to take place.

As a result of a further rotation of the rotary arm 96, the residual mandrel which is held by the gripper element 24A is supplied laterally to the provision unit via the further slot 102, and is extracted from said position by means of a vacuum via the residual mandrel hose, and is thereby disposed of. Alternatively, the residual mandrel is vacuum-extracted directly from the riveting unit 6 or collected in a residual mandrel collecting container.

Figure 9:
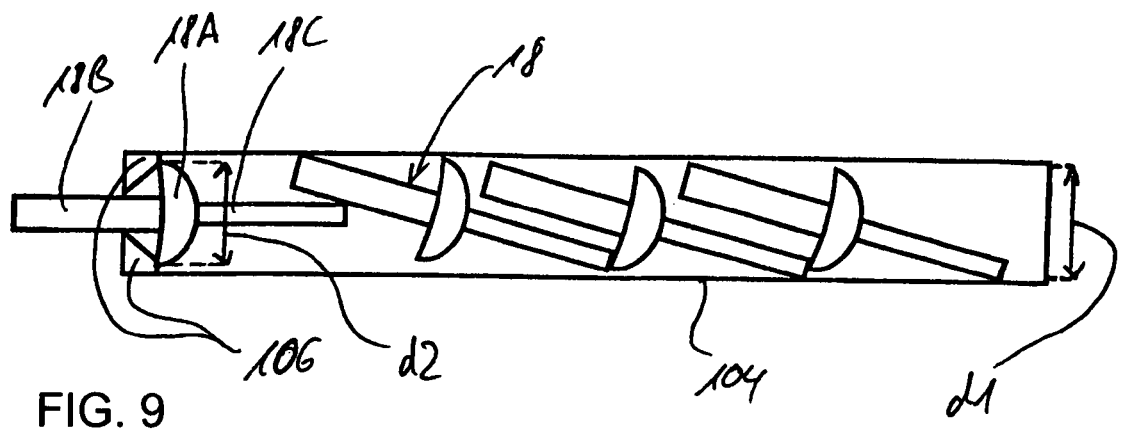
FIG. 9 shows a side view of a magazine hose.

Instead of the individual firing-in of the blind rivets 18 from a separating station into the provision unit 20, a magazine hose 104 is provided, as is schematically illustrated in FIG. 9. The magazine hose 104 is in particular a part of a conventional supply hose and has an inner diameter d1 which is matched to the outer diameter d2 of the blind rivet 18 as defined by the swage head 18A of the blind rivet 18. Here, d1 is slightly larger than d2 in order to prevent the blind rivets 18 becoming jammed within the magazine hose 104. At its front end, the magazine hose 104 has a holding element 106 which forms a holding or stop position for the blind rivet 18 which is then gripped by the gripper element 24. The holding element 106 is designed here so as not to hinder the extraction of the blind rivet 18 from the magazine hose 104. For this purpose, said holding element 106 is for example composed of a plurality of segments which can be pushed apart in the radial direction counter to a spring force when the gripper element pulls the blind rivet forward. The individual segments of the holding element 106 are for this purpose designed so as to taper toward the central axis of the magazine hose 104. As a result of the tapered design, an insertion funnel for the rivet sleeve 18B of the blind rivet 18 is also formed, with which said blind rivet 18 is supplied forward. Also adjoining the swage head 18A, opposite the rivet sleeve 18B, is the rivet mandrel 18C.

Figure 10:
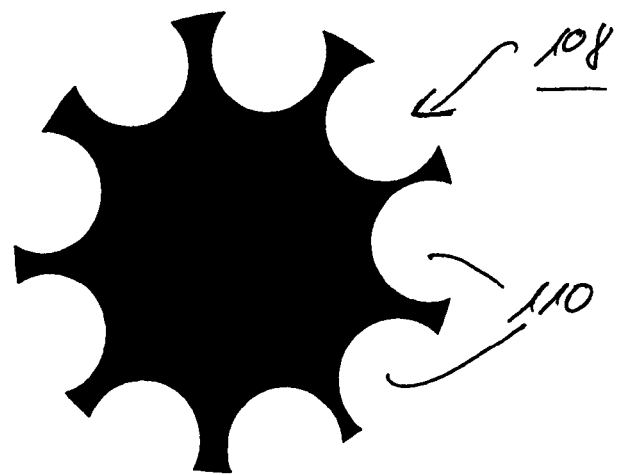
FIG. 10 shows a front view of a hose holder and FIG. 11 shows a highly schematized sectioned illustration of a hydraulic unit.

The magazine hose 104 is automatically or else manually filled in a filling station. The magazine hose 104 is then brought to the provision unit 20 and is inserted there in a hose holder 108, as is illustrated for example in FIG. 10. Here, the hose holder 108 is designed in the form of a holding star and has a plurality of clamping or latching openings distributed about its periphery, into which the respective magazine hose 104 is clipped. During operation, in each case one of the magazine hoses 104 is placed into an extraction position from which the gripper element 24 receives the blind rivets 18 which are stored in said magazine hose 104. The retaining element 106 subsequently rotates until the next magazine hose 104 is in the extraction position. Instead of the individual loading of the holding element 106 with a plurality of magazine hoses 104, in order to fill the magazine, the unit composed of the holding element 106 and the magazine hoses 104 which are clipped therein is exchanged completely.

As can be seen from FIG. 9, the individual blind rivets 18 partially overlap as a result of an inclined position, specifically such that in each case the rivet sleeve 18B overlaps the rivet mandrel 18C of the preceding blind rivet 18. This results in a compact arrangement of the blind rivet 18. At the same time, however, each individual blind rivet 18 can be easily extracted individually by means of the gripper element 24. In order to convey the blind rivets 18 in each case forward to the holding element 106, the magazine hose 104 is provided for being connected to a compressed air supply (in a way not illustrated in any more detail here). For this purpose, the magazine 104 has, at its rear end, for example a pneumatic connection with which it is plugged to a pneumatic supply.

The particular advantage of the blind rivet magazine, in particular in the structurally very simple design of a magazine hose 104 as described here, is to be considered that of the magazine being arranged directly on the robot, in particular on the robot hand, and therefore that of a complex supply by means of supply hoses not being necessary. Since only extremely short supply paths over the length of the magazine hose are required, only very low compressed air quantities or air pressures are required. In addition, it is expediently provided that a central filling station for the magazine, composed of the hose holder 108 and the magazine hoses 104, is provided, with a plurality of robots 4 being supplied from the central filling station.

It is preferably also provided that the empty magazine hoses 104, after the blind rivets 18 have been used up, are at the same time used as residual mandrel collecting containers. At the beginning, when the magazine is full, one magazine hose 104 is therefore provided, as a residual mandrel hose, as an empty hose. In this design, with the exchange of the magazine, a residual mandrel disposal is automatically carried out at the same time, and a separate residual mandrel disposal is dispensed with.

Figure 11:
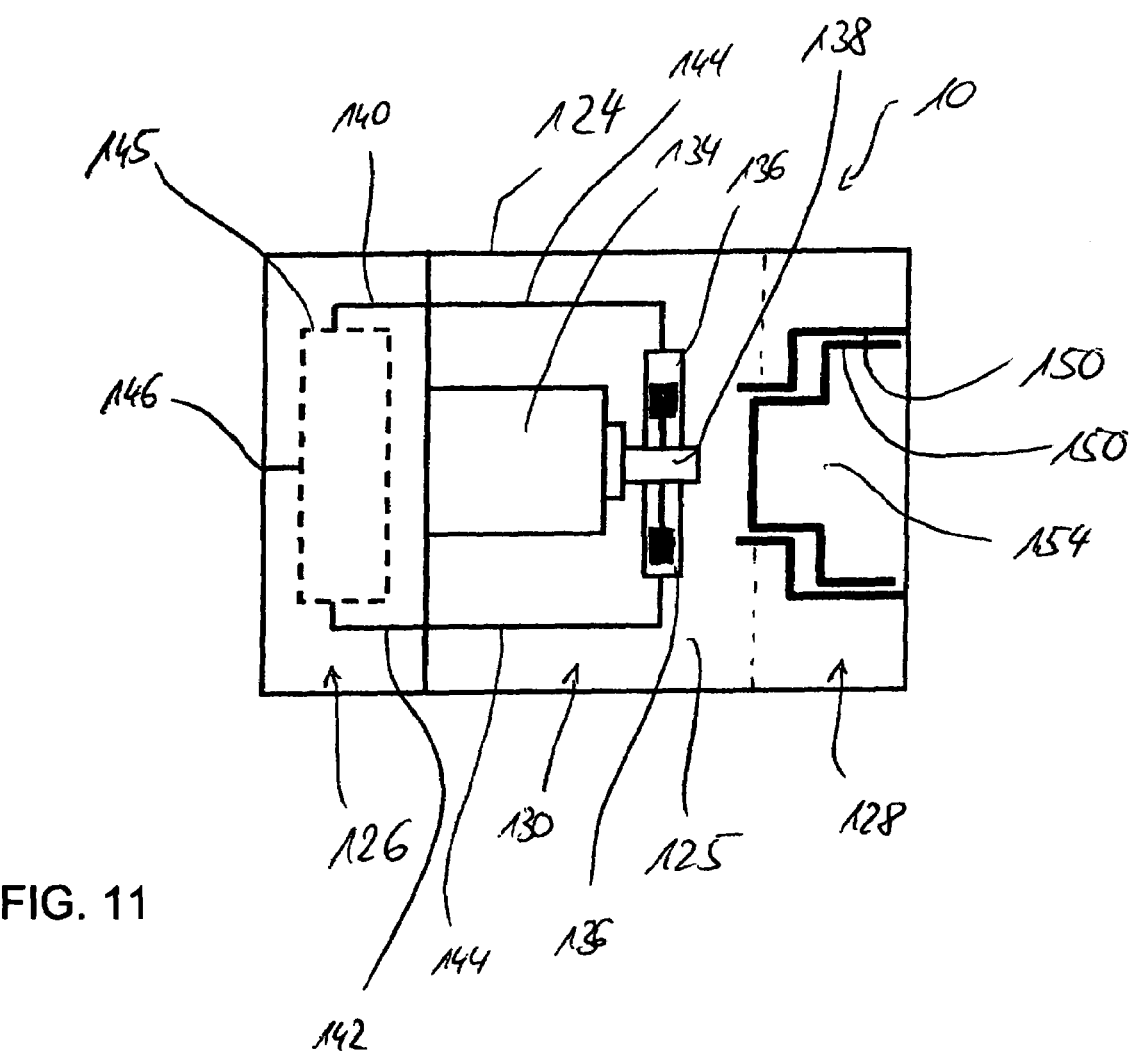

The hydraulic unit 10 which is illustrated in highly simplified form in FIG. 11 has, overall, a substantially cylindrical housing 12 whose interior space forms an accumulator space 125 for the hydraulic liquid and is hermetically sealed off. The housing 124 is closed off at its left-hand end side by means of a control or functional block 126 which is formed in the manner of a housing cover. At the right-hand end side which is situated opposite the functional block 126, the hydraulic unit 10 has a compensating block 128 which closes off the housing 124 at the rear end side. Between said two blocks 126, 128 is arranged a pressure generating block 130.

The pressure generating block 130 is formed substantially by a suboil electric motor 134, which is designed as an alternating current servo motor, and a plurality of pumps 136 which are designed as piston pumps and are arranged annularly around an eccentric shaft 138 so as to be alternately actuated by the latter. The pumps 136 are therefore driven directly by the electric motor 134 without the interposition of a gearing. Each of the pumps 136 is adjoined at the pressure side by a pressure line 144 which is designed as a duct and leads to a valve arrangement 145 in the functional block 6. The suction side of the pumps 138 is connected in each case to the interior space 5 in which the hydraulic oil is situated. A total of six pumps 136 are preferably arranged annularly around the eccentric shaft 138, with alternately adjacent pumps 136 being provided for the generation of two different pressure partial flows, specifically a low-pressure partial flow 140 with a pressure at the level of approximately $200 \times 10^5$ Pa and a high pressure partial flow 142 with a pressure at the level of approximately $500 \times 10^5$ Pa.

Formed in the functional block 126, which is designed as a solid metal cover, are a plurality of ducts for forming hydraulic lines and bores for the arrangement of hydraulic valves, so that the functional block 126 forms a valve block with an integrated valve arrangement 145.

All the hydraulic control elements are integrated in the functional block 126. By means of the functional block 126, the hydraulic oil provided at an outlet 146 is controlled, that is to say, by means of the functional block 126, the hydraulic pressure at the outlet 146 is controlled. No hydraulic control elements are required thereafter. Moreover, it is possible for a hydraulic line to be connected directly to the outlet 146 and for a corresponding hydraulic inlet to be connected to the riveting unit 6.

The compensating block 128 comprises an annular or cylindrical housing wall which is formed by the housing 124 and forms a cylinder 150 which is open toward the interior space. Arranged with a tight fit in said cylinder 150 is a piston 152 which forms a compensating wall. The piston 152 is sealed off with respect to the inner wall of the cylinder 150 and is arranged so as to be moveable relative to the cylinder 150 in the longitudinal direction. The piston 152 is designed as a hollow piston which, like the cylinder 150, widens in cross section in a stepped fashion. The hollow space of the piston 152 forms a pressure space which can be acted on with a predefinable pressure via a pneumatic connection. The pressure space is delimited at the rear side by a positionally fixed end wall of the housing. The illustrated design serves to create a pressure booster and media converter.

To operate the hydraulic unit 10, the interior space 125 is filled completely with a hydraulic liquid, in particular hydraulic oil, so that the electric motor 134 and, with it, the pumps 136 are mounted in hydraulic oil. The entire interior space 125 is free of gas and air. In order to reliably maintain this, a counterpressure of approximately $5-15 \times 10^5$ Pa is generated in the pressure space by means of the pressure compensating block 130 by applying a corresponding pneumatic pressure. The entire housing interior space 125 is therefore subjected to an overpressure.

To provide the hydraulic liquid at the outlet 146 at high pressure, the electric motor 134 is started on demand. That is to say that the hydraulic pressure is generated only when it is actually required, for example if the blind rivet 18 is already inserted in the blind rivet hole 29 and the placement process begins by means of a tension applied to the rivet mandrel. No pressure accumulator is provided. By means of the electric motor 134, the eccentric shaft 138 is set in rotation such that the individual pumps 136 are actuated alternately and in an encircling fashion, which pumps 136 in each case deliver a predefined quantity of hydraulic liquid into the pressure line 144 and therefore to the functional block 126.

Since the hydraulic quantity in the interior space 125 varies during operation, in order to prevent the formation of gas bubbles in the hydraulic liquid, the volume of the interior space 125 is variable. The volume of the interior space 125 therefore forms a compensating volume, and the interior space 125 forms an accumulator space. In order to vary the volume, the piston 152 moves within the cylinder 150 corresponding to the respective present demands.

During the placement process, a switch is automatically made on demand between the two partial flows 140 and 142 by means of the valve arrangement 145, so that in each case only one partial flow 140, 142 is provided at the outlet 146. The other partial flow 142, 140 is in each case placed in a pressureless state.

The hydraulic power unit described here is also distinguished by its very compact design while at the same time generating very high pressures. The hydraulic power unit expediently has an approximately cylindrical housing which has a length of only approximately 30-40 cm with a diameter of approximately 12 cm. At the same time, the hydraulic power unit is provided for providing in particular the two pressure partial flows, with the low-pressure partial flow being provided for example for approximately $200 \times 10^5$ Pa and the high-pressure partial flow being provided preferably for $500 \times 10^5$ Pa. Even with an entire installation space of 3000 to 10000 ccm, a mobile hydraulic unit is therefore created which permits two hydraulic partial flows with 100 to 300 bar and 300 to 700 bar pressure. Here, the entire volume of the hydraulic liquid within the hydraulic power unit is preferably only approximately 500 ml. The hydraulic power unit is distinguished overall by a high power density with low energy consumption. Since no pressure-limiting valves are provided and the hydraulic power unit is operated in shut-down operation, that is to say is operated only when there is actually a pressure demand, only low energy losses occur, and the required energy consumption is low. This permits the use of a comparatively low-power and compact electric motor.

LIST OF REFERENCE SYMBOLS

54 High-pressure partial flow
56 Low-pressure partial flow
124 Housing
125 Interior space
126 Functional block
128 Compensating block
130 Pressure generation block
134 Electric motor
136 Pump
138 Eccentric shaft
144 Pressure line
145 Valve arrangement
146 Outlet
150 Cylinder
152 Piston
154 Pressure space

The invention claimed is:
1. A robot hand, comprising:
   a machining tool designed to perform a hydraulically-generated movement;
   an hydraulic unit connected to said machining tool, said hydraulic unit having an electric motor and at least one pump driven by said electric motor for generating a pressure;
   an accumulator space with a variable compensating volume enclosing hydraulic liquid in a gas-free state, said accumulator space communicating with said pump to supply said pump with the hydraulic liquid.

2. The robot hand as claimed in claim 1, wherein the hydraulic liquid is enclosed in the accumulator in a gas-free state and under pressure.

3. The robot hand as claimed in claim 1, in which the hydraulic unit has a housing formed with an interior space housing the electric motor and the pump, and the interior space forms the accumulator space which is filled with the hydraulic liquid.

4. The robot hand as claimed in claim 1, wherein the accumulator space is defined between a compensating wall and a stationary housing wall, and wherein the compensating wall of the accumulator space is arranged in the manner of a piston so as to be moveable and sealed off with respect to a stationary housing wall of the accumulator space.

5. The robot hand as claimed in claim 1, in which the pump is one of at least two pumps for providing a low-pressure partial flow and a high-pressure partial flow, and wherein the at least two pumps are commonly driven by the electric motor.

6. The robot hand as claimed in claim 5, which comprises a valve arrangement designed such that in each case only one partial flow is provided at the outlet, while another partial flow is placed in a pressureless state.

7. The robot hand as claimed in claim 5, in which the machining tool comprises a placement unit for fastening a fastening element to a workpiece, and a supply unit for automatically supplying the fastening element to the placement unit, the supply unit having a gripper element for the fastening element, and wherein said gripper element is configured for automatically receiving the fastening element from a provision unit and for automatically supplying it to the placement unit and, for this purpose, is moveable in an axial direction and/or rotatable about the axial direction.

8. The robot hand as claimed in claim 7, in which the gripper element is arranged on a rotary element which is rotatable about the axial direction, and wherein at least one electromagnet is disposed such that a torque which acts on the rotary element is generated by a magnetic force.

9. The robot hand as claimed in claim 7, in which a permanent magnet is arranged on the rotary element.

10. The robot hand as claimed in claim 7, in which the rotary element is at the same time moveable in the axial direction.

11. The robot hand as claimed in claim 7, in which the rotary element has an axial positive guide in a rear region from which the rotary element can be moved axially from a retracted position into a forward rotary position.

12. The robot hand as claimed in claim 7, in which the placement unit has a lateral supply slot for the lateral supply of the fastening element.

13. The robot hand as claimed in claim 7, in which the provision unit is formed with a lateral extraction slot for a lateral extraction of the fastening element by the gripper element.

14. The robot hand as claimed in claim 3, in which the provision unit has a magazine for storing a plurality of fastening elements.

15. The robot hand as claimed in claim 14, in which the magazine comprises at least one magazine hose configured to hold a plurality of fastening elements in a row.

16. The robot hand as claimed in claim 15, in which the magazine hose can be acted on with compressed air.

17. The robot hand as claimed in claim 14, in which a plurality of magazine hoses are held in a moveable hose holder which is designed such that in each case one of the magazine hoses is in an extraction position in which the fastening elements are dispensed.

18. The robot hand as claimed in claim 14, which further comprises a compensating unit configured such that the placement unit of the machining tool is mounted so as to be aligned in the axial direction in such a way as to permit a compensating movement in a plane which is aligned perpendicular to the axial direction.

19. The robot hand as claimed in claim 18, in which a holding element is provided which holds the tool unit in a defined position within the plane so as to be aligned perpendicular to the axial direction and, under the action of a predetermined force, releases the tool unit so as to permit the compensating movement.

20. The robot hand as claimed in claim 18, in which the placement unit is connected by means of a compensating element to a holder, with the compensating element being arranged on the holder so as to be moveable in the plane perpendicular to the axial direction.

21. The robot hand as claimed in claim 20, in which the placement unit is connected to the compensating element by means of a bearing which permits a tilting movement relative to the axial direction.

22. The robot hand as claimed in claim 19, which comprises a return device having the holding element and exerting a return force on the compensating element in a plane perpendicular to the axial direction in order to return the compensating element into an initial position.

23. The robot hand as claimed in claim 18, in which the holder is designed as a feed unit which permits a feed movement in the axial direction.

24. The robot hand as claimed in claim 18, in which a hole detection unit is provided which is designed to detect the position of a hole for the fastening element.

25. The robot hand as claimed in claim 24, in which the hole detection unit has a light source and an optical camera and an evaluating unit for evaluating images recorded by the camera.

26. The robot hand as claimed in claim 24, in which the hole detection unit is designed so as to determine the position of a rivet hole by detecting the corner of the hole edge.

27. The robot hand as claimed in claim 25, in which the light source is a linear laser which generates at least three laser beams which are arranged so as to be offset relative to one another at a predetermined rotational angle.

28. The robot hand as claimed in claim 25, in which the placement unit is connected to a re-positioning unit for precise positioning in the plane perpendicular to the axial direction.

29. A method for the automatic arrangement of an element on a workpiece using a robot hand as claimed in claim 1.

* * * * *